(12) United States Patent
Krebber et al.

(10) Patent No.: US 11,167,362 B2
(45) Date of Patent: Nov. 9, 2021

(54) SAWBLADE FOR A CIRCULAR SAW, METHOD FOR PRODUCING A SAWBLADE, AND CIRCULAR SAWING MACHINE

(71) Applicant: KEURO Besitz GmbH & Co. EDV-Dienstleistungs KG, Achern (DE)

(72) Inventors: Sonke Florian Krebber, Baden-Baden (DE); Armin Stolzer, Baden-Baden (DE)

(73) Assignee: KEURO BESITZ GMBH & CO. EDV-DIENSTLEISTUNGS KG, Achern (DE)

( * ) Notice: Subject to any disclaimer, the term of this patent is extended or adjusted under 35 U.S.C. 154(b) by 116 days.

(21) Appl. No.: 15/609,391

(22) Filed: May 31, 2017

(65) Prior Publication Data

US 2017/0368623 A1 Dec. 28, 2017

(30) Foreign Application Priority Data

Jun. 23, 2016 (DE) .......................... 102016111543.6

(51) Int. Cl.
*B23D 59/02* (2006.01)
*B23D 61/02* (2006.01)
*B23D 47/00* (2006.01)
*B23D 65/00* (2006.01)

(52) U.S. Cl.
CPC ......... *B23D 59/025* (2013.01); *B23D 47/005* (2013.01); *B23D 59/02* (2013.01); *B23D 61/025* (2013.01); *B23D 65/00* (2013.01)

(58) Field of Classification Search
CPC ..... B23D 61/025; B23D 59/02; B23D 50/025
See application file for complete search history.

(56) References Cited

U.S. PATENT DOCUMENTS

| 927,164 | A |  | 7/1909 | Puffer |  |
|---|---|---|---|---|---|
| 3,578,779 | A | * | 5/1971 | Ishizaki | B27B 17/02 83/821 |
| 3,674,065 | A |  | 7/1972 | Fairfield, Jr. et al. |  |
| 4,333,371 | A | * | 6/1982 | Matsuda | B23D 59/025 83/169 |
| 4,715,254 | A |  | 12/1987 | DeGan |  |
| 5,025,561 | A | * | 6/1991 | Sugihara | B27B 17/025 30/383 |
| 5,958,306 | A | * | 9/1999 | Curtis | F28F 25/02 261/112.2 |
| 9,302,411 | B2 |  | 4/2016 | Kahkonen et al. |  |

(Continued)

FOREIGN PATENT DOCUMENTS

| CN | 104191467 | 12/2014 |
|---|---|---|
| CN | 204019643 | 12/2014 |

(Continued)

*Primary Examiner* — Ghassem Alie
*Assistant Examiner* — Fernando A Ayala
(74) *Attorney, Agent, or Firm* — Volpe Koenig (57) ABSTRACT

A sawblade for a circular saw, including a round, disk-shaped core blade made from one or more parts, with a plurality of circumferentially distributed saw teeth being arranged at its external perimeter and with its center comprising a connection for fastening the sawblade at a driveshaft, and at least one side area of the core blade including open channels 7 for guiding liquids. A circular sawing machine having such a sawblade and a method for producing such a sawblade are also provided.

12 Claims, 6 Drawing Sheets

(56) References Cited

U.S. PATENT DOCUMENTS

| | | | |
|---|---|---|---|
| 9,623,500 B2 * | 4/2017 | Friedrichs | B23D 59/02 |
| 2001/0047711 A1 | 12/2001 | Gravely et al. | |
| 2008/0035318 A1 * | 2/2008 | Kamada | F24F 1/18 |
| | | | 165/133 |
| 2008/0110903 A1 * | 5/2008 | Schur | A47G 19/12 |
| | | | 220/600 |
| 2010/0126322 A1 * | 5/2010 | Friedrichs | B23D 61/025 |
| | | | 83/171 |
| 2010/0247176 A1 * | 9/2010 | Tanaka | G03G 15/167 |
| | | | 399/313 |
| 2011/0107892 A1 * | 5/2011 | Imamura | B23D 45/048 |
| | | | 83/471.3 |
| 2011/0164958 A1 * | 7/2011 | Saitoh | F01D 1/026 |
| | | | 415/1 |
| 2013/0008293 A1 * | 1/2013 | Friedrichs | B23D 59/02 |
| | | | 83/169 |
| 2014/0212318 A1 | 7/2014 | Friedrichs | |
| 2016/0008897 A1 | 1/2016 | McGehee | |
| 2019/0142231 A1 * | 5/2019 | Nelson | A47K 11/026 |
| | | | 4/483 |

FOREIGN PATENT DOCUMENTS

| | | |
|---|---|---|
| CN | 204148645 | 2/2015 |
| DE | 34151 | 1/1886 |
| DE | 3708360 | 9/1988 |
| DE | 102007022310 | 11/2008 |
| EP | 0239676 | 10/1987 |
| JP | 60167744 | 8/1985 |
| JP | 6416215 | 1/1989 |
| JP | 524301 | 3/1993 |
| JP | 10235601 | 9/1998 |
| JP | 2011146456 | 7/2011 |

* cited by examiner

SAWBLADE FOR A CIRCULAR SAW, METHOD FOR PRODUCING A SAWBLADE, AND CIRCULAR SAWING MACHINE

INCORPORATION BY REFERENCE

The following documents are incorporated herein by reference as if fully set forth: German Patent Application No. 10 2016 111 543.6, filed Jun. 23, 2016.

BACKGROUND

The present invention relates to a sawblade for a circular saw, a circular sawing machine comprising such a sawblade, and a method for producing such a sawblade.

A sawblade of the present type comprises a core blade shaped as a circular disk made from one or more parts, with a plurality of saw teeth being arranged distributed over the circumference of its exterior perimeter. In the center of the core blade means are provided for fastening the sawblade at a driveshaft, which in the simplest case comprise an opening for a driveshaft penetrating it and an entraining notch. The saw teeth may be formed in one piece in the core blade, which particularly means that the core blade was formed from a single workpiece together with the circumferentially distributed saw teeth. Depending on the field of application the saw teeth may however also be produced separately and attached to the core blade, or the saw teeth are provided with hard-metal or ceramic blades and the like. The core blade itself is commonly made from metal; however within the scope of the present invention other materials are possible as well, such as particularly ceramic materials.

Such sawblades are used in various configurations, for example in hand-held machine tools, in simple stationary circular saws for construction sites or shops for sawing wood, slabs, or the like, as well as in an industrial scale within the scope of a circular sawing machine. Such a sawing machine comprises a fixed or movable support for at least one workpiece to be sawed, which is generally embodied as a saw table, as well as a fixed or movable fastening device for the sawblade and a drive unit with a driveshaft, at which the sawblade is fastened in a detachable fashion.

In particular in case of an industrial application within the scope of a circular sawing machine, and here in turn particularly when sawing metallic materials it is mandatory to wet the saw teeth with a lubricating liquid during the penetration into the workpiece to be sawed and/or in the cutting channel. At high cutting speeds it is furthermore necessary to feed a liquid volume per time unit to the saw teeth, which is capable to generate a cooling effect.

In prior art, circular sawing machines comprise therefore devices for applying a cooling-lubricating emulsion upon the exterior perimeter of the sawblade in order to spray, drip, or via a jet apply the cooling-lubricating emulsion via a nozzle or a simple outlet upon the exterior perimeter and the saw teeth of the sawblade, namely as shortly as possible before the saw teeth come into contact with the material to be sawed.

It is obvious that this conventional application of cooling-lubricating emulsion upon the sawblade cannot occur with the precision desired. Additionally, it is naturally difficult in circular saws to provide the position at the exterior perimeter of the sawblade with cooling-lubricating emulsion, which is as close as possible near the entry point of the saw teeth into the material to be sawed, because this position changes according to the progression of the sawing process.

In order to attain this problem better than in the above-mentioned conventional manner DE 37 08 360 A1 has suggested to produce a sawblade for a circular saw from several parts by assembling the core blade from two disks, parallel to each other and spaced apart via spacers, with channels remaining between the spacers and thus inside the core blade in which a liquid cooling medium can flow to the external perimeter of the sawblade. The liquid cooling medium can therefore be introduced into a central area of the sawblade in a targeted fashion, from where then, via channels extending inside the sawblade, it is transported to the external perimeter of the sawblade and thus to the saw teeth.

A similar solution is known from DE 10 2007 022 310 A1. Here, too a sawblade for a circular saw is produced from several parts with channels located at the inside in which a liquid cooling medium can flow from a central area of the sawblade to its exterior perimeter.

These known sawblades, comprising several parts and being provided with channels located at the inside, are however not only expensive in their production but it must also be feared that their internal stability and the vibration behavior are negatively influenced by the channels and the multi-part design. However, particularly problematic is the thickness and/or blade width of the core blade caused by the channels located at the inside; because the cutting channel must obviously have a width in the workpiece to be sawed that allows for a core blade of the sawblade to fit into it. The wider the cutting channel the more material is machined during the sawing process, which increases costs and shall be avoided therefore.

SUMMARY

The present invention is thus based on the objective to provide a sawblade according to the type mentioned at the outset as well as a circular sawing machine comprising such a sawblade and a method for producing such a sawblade allowing an efficient supply of the saw teeth with a liquid, particularly a cooling-lubricating emulsion, while maintaining the stability and material thickness of a conventional sawblade.

This objective is attained in a sawblade, a circular sawing machine, as well as a method with one or more features of the invention. Preferred embodiments of the sawblade and the circular sawing machine according to the invention are disclosed in detail below and in the claims.

The sawblade according to the invention for a circular saw, which comprises a disk-shaped core blade made from one or more parts, with a plurality of saw teeth being arranged distributed over its circumference at the exterior perimeter and with its center comprising means for fastening the sawblade at a driveshaft is therefore characterized in that at least one side area of the core blade is provided with open channels for guiding liquids, with these channels being inserted particularly by way of cutting, for example by laser cutting into the respective side area of the core blade.

The open channels according to the invention, which are embodied for example as grooves, notches, or recesses in the sense of guiding lines and are perhaps provided with variable depths and/or structures, guide a liquid, thus generally a cooling-lubricating emulsion, from an area of the core blade, spaced apart from the exterior perimeter, to the exterior perimeter, and thus to the saw teeth, utilizing the centrifugal force of the rotary motion of the sawblade. With increasing progression of the sawing process, thus generally when particularly many saw teeth are engaging the material to be sawed, the workpiece to be sawed ensures in the cutting channel for the sealing of the open channels, because it closes them like a lid. Outside the material to be sawed the generally existing adhesive effects between the liquid and the core blade ensure that the liquid is guided at least to a large extent along the open channels. If the core blade is shaped in such a fashion that its central sections exhibit a lower material thickness than its edge sections, here during the rotary motion of the sawblade even a component of the centrifugal force develops which holds the liquid in the open channels.

The centrifugal force acting generated by the rotation of the sawblade accelerates the liquid guided in the channels according to the invention towards the exterior perimeter of the core blade such that when the channels end between the saw teeth, i.e. in the chip spaces of the sawblade, the liquid is capable of flushing the chips out of the chip spaces. Perhaps this allows waiving mechanic chip space brushes; in any case however the risk is further reduced that chips, potentially adhering at the exterior perimeter of the sawblade, are entrained into the cutting channel during the reentry into the workpiece to be sawed.

The open channels provided according to the invention on one or both side areas of the core blade allow therefore the supplying of a liquid, particularly a cooling-lubricating emulsion, to be supplied more efficiently than in sawblades and circular sawing machines of prior art to the area of the saw teeth, without here requiring that the sawblade is produced in a more expensive fashion and without increasing the width of the sawblade, and thus expanding the width of the cutting channel.

The open channels may be embodied like tire treads of vehicles and be adjusted to the viscosity and adhesive features of the liquid used as well as the geometry and rotary speed of the sawblade. In particular, they may exhibit an arched progression in order to accelerate a liquid guided therein, due to a rotation of the sawblade and a centrifugal force generated thereby, towards the exterior perimeter of the core blade.

In order to further bundle the targeted guidance of the liquid used in the open channels according to the invention, it may be provided within the scope of the present invention to equip the surface of the side area of the core blade, which is provided with channels, or perhaps both side areas of the core blade with a fluid-repellent coating. This can occur in a particularly efficient fashion with a method according to the invention, based on which at least one side area of the core blade is provided with a fluid-repellent coating and thereafter the open channels are entered therein to guide liquids, with this beneficially occurring by way of laser engraving. By the cutting process the fluid-repellent coating is penetrated such that the open channels developing are particularly not provided with a fluid-repellent coating.

If the means for fastening the sawblade to a driveshaft comprise at least one flange attached to the core blade it is preferred within the scope of the present invention that at least a portion of the open channels sectionally extend under said flange, thus the channels extend until underneath the flange. Then preferably a liquid reservoir can be formed between the flange and the side areas of the core blade into which at least a portion of the channels extend and from which the liquid can be guided through the channels to essentially the external perimeter of the core blade.

The supply of liquid into the liquid reservoir can then occur via a liquid feed at the flange, or also via the drive shaft; the latter applies when the driveshaft is provided with a liquid passage, which extends from a connection to a liquid reservoir formed between the flange and the side area of the core blade.

A supply of liquid through the driveshaft of a circular sawing machine according to the invention can also be advantageous without a flange because a driveshaft with a penetration for liquids is particularly suited to guide liquids from a connection to the area in which the sawblade is to be fastened on the driveshaft. Due to the fact that this regularly is the case in the central area of the sawblade, the liquid can then from here be guided via the open channels according to the invention, due to the rotary motion of the sawblade, to its external perimeter and particularly to the saw teeth or between them.

In many cases a sawblade according to the invention will be provided with a guiding device, which comprises a fastening and gliding parts for an at least temporary gliding contact with the core blade. If for such a case the sawblade is provided with open channels according to the invention such that they partially extend in an area brushed by this guiding device and particularly, starting from this area of the core blade, extend essentially to the external perimeter of the core blade, the supply of the liquid can also occur via this guiding device, with here the fastening of the guiding device then being provided with a liquid connection. Any supply of liquids via the driveshaft or via a flange rotating with the sawblade is here unnecessary. As a side-effect, advantageously also the gliding parts are supplied with the liquid, thus particularly a cooling-lubricating emulsion. Due to the fact that such guiding devices are arranged as closely as possible near the exterior perimeter of the sawblade, the path that the liquid needs to travel in the open channels according to the invention to the saw teeth is particularly short, and the area in which the channels in the cutting groove are covered by the sawed material is particularly large.

BRIEF DESCRIPTION OF THE DRAWINGS

In the following, several exemplary embodiments of a sawblade designed according to the invention are described in greater detail and explained based on the attached drawings. Shown here are.

DETAILED DESCRIPTION OF THE PREFERRED EMBODIMENTS

FIGS. 1 to 10 show different exemplary embodiments of a sawblade designed according to the invention, with identical or equivalent elements respectively being provided with the same reference characters. Accordingly, not all details are repeatedly described in all exemplary embodiments.

Figure 1:
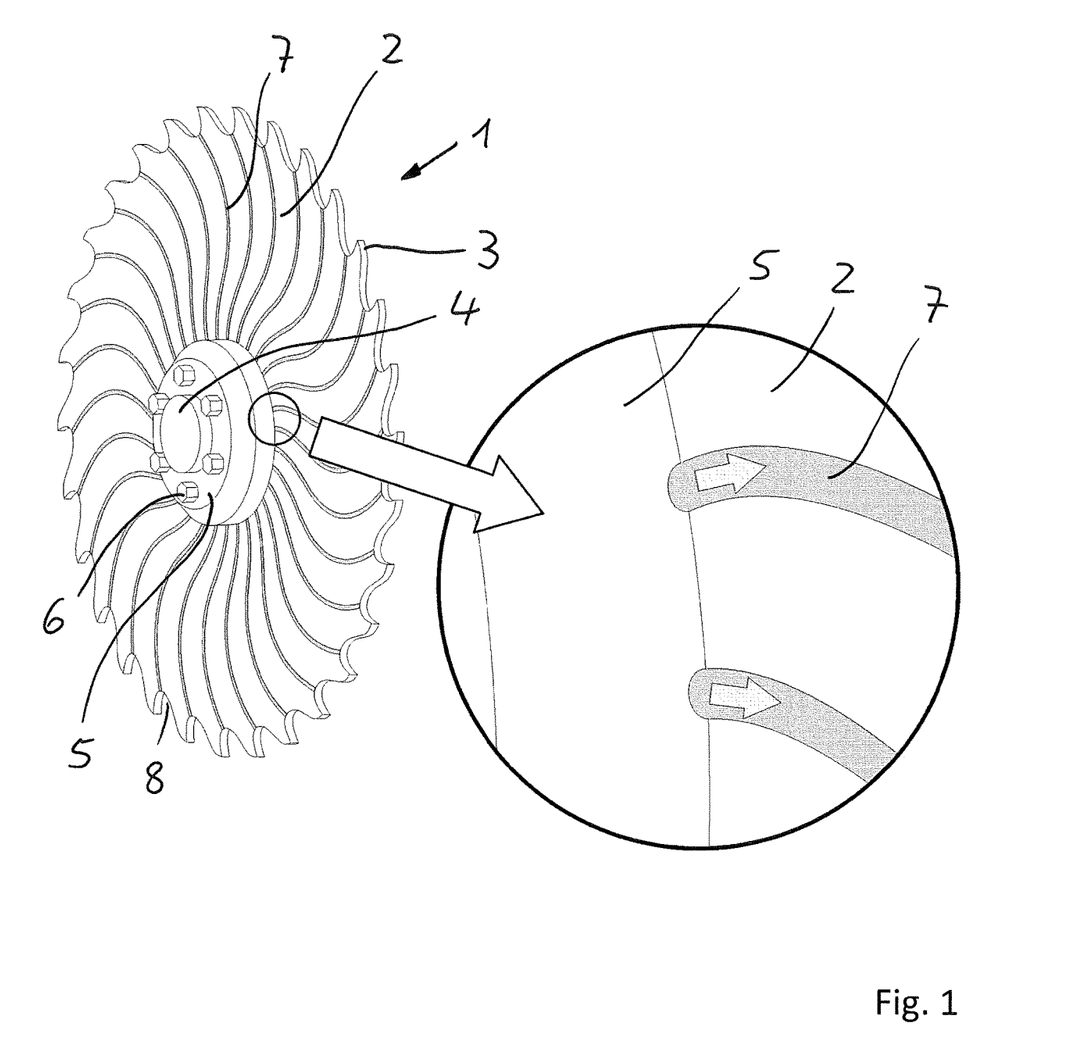
FIG. 1 a perspective illustration of a sawblade embodied according to the invention with an enlarge detail.

FIG. 1 shows in a perspective view, with an enlarged detail, a sawblade 1, comprising a core blade 2 embodied here in one piece, which ends at its exterior perimeter in a plurality of saw teeth 3 distributed over the circumference. An opening (not visible here) is located in the center of the core blade 2, penetrated by a driveshaft 4. The torque-proof connection between the driveshaft 4 and the core blade 2 is implemented by a flange 5, which is fastened with a plurality of screws 6 to the core blade 2.

A liquid reservoir is located between the flange 5 and the core blade 2 for a cooling-lubricating emulsion, which is supplied via a liquid passage (not shown) in the driveshaft 4.

The side area of the core blade 2 visible here is provided with a plurality of engraved channels 7, as disclosed by the enlarged detail in FIG. 1, which extend on the one side until underneath the flange 5 and there extend to the liquid reservoir and on the other side end in the chip spaces 8 between the saw teeth 3 at the external perimeter of the core blade 2.

Based on the rotary motion of the sawblade 1, a centrifugal force acts upon the liquid in the liquid reservoir underneath the flange 5 such that the liquid, as shown in the enlarged detail of FIG. 1, is accelerated in the channels 7 towards the external perimeter of the sawblade 1. Based on adhesion forces and the arc-shaped progression of the channels 7, the liquid remains essentially in the channels 7 and is this way reliably guided to the chip spaces 8 between the saw teeth 3. In particular when the saw teeth 3 travel through a cutting channel in the material to be sawed, the channels 7 are covered in the cutting channel, which can be additionally considered for the arc-shaped progression of the channels 7. The side area of the core blade 2 can additionally be provided with a liquid-repellent coating outside the channels 7 so that the liquid is guided even better inside the channels 7.

Figure 2:
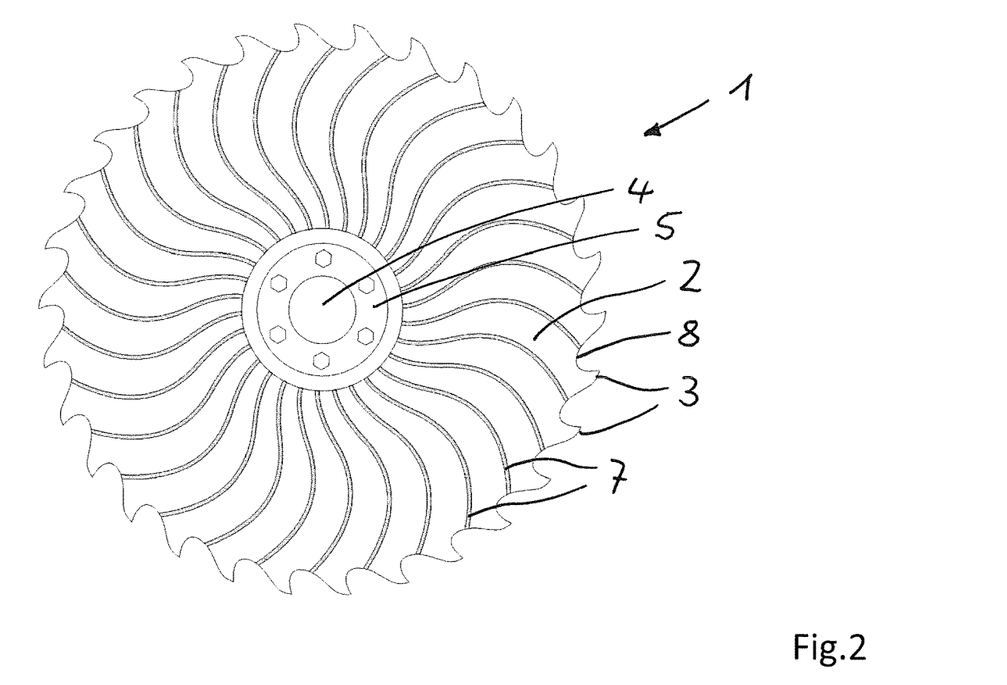
FIG. 2 a top view of another embodiment of a sawblade according to the invention.
Figure 3:
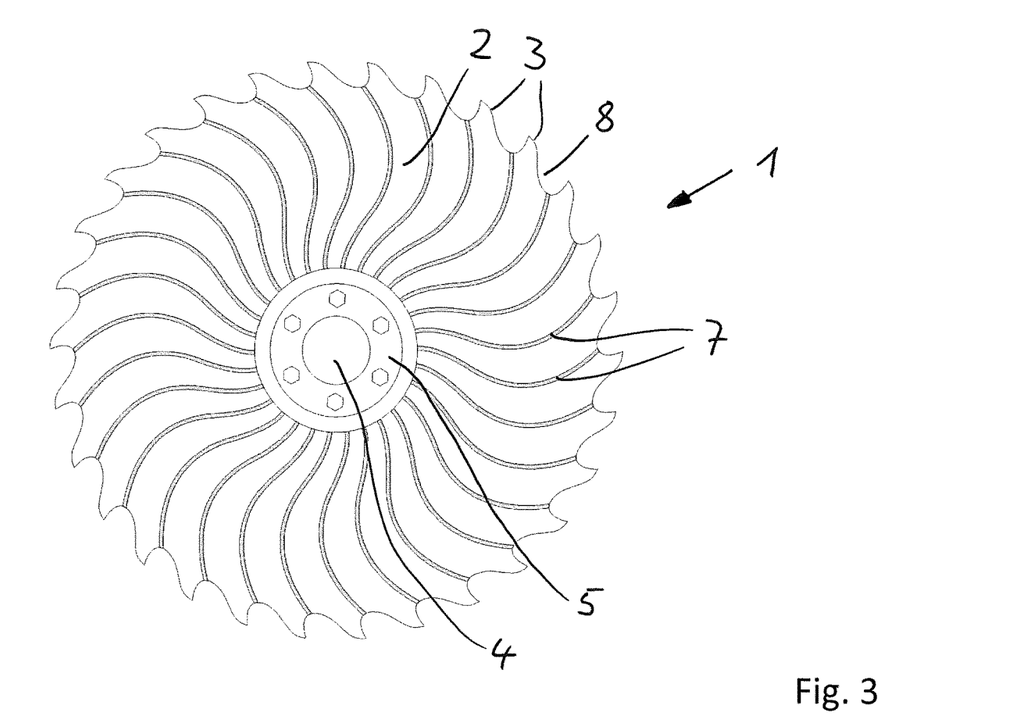
FIG. 3 a top view of a sawblade of FIG. 1.

FIG. 3 shows a top view of the sawblade 1 of FIG. 1, while FIG. 2 also discloses such a top view of a similarly embodied sawblade 1, with here however the channels 7 comprising a mirrored arc-shaped progression. Due to the fact that the sawblade 1 in the illustration of FIGS. 2 and 3 moves in a counter-clockwise direction, in the exemplary embodiment according to FIG. 2 in the arc-shaped progression of the channels 7 the liquid guided in these channels 7 is initially accelerated primarily in the direction of rotation near the central regions of the core blade 2, while the radial acceleration increases the more the liquid in the channels 7 approaches the external perimeter of the sawblade 1.

In the chip spaces 8 the liquid then exits the channels 7 with high speeds such that it is capable to rinse chips out of the chip spaces 8.

Figure 4:
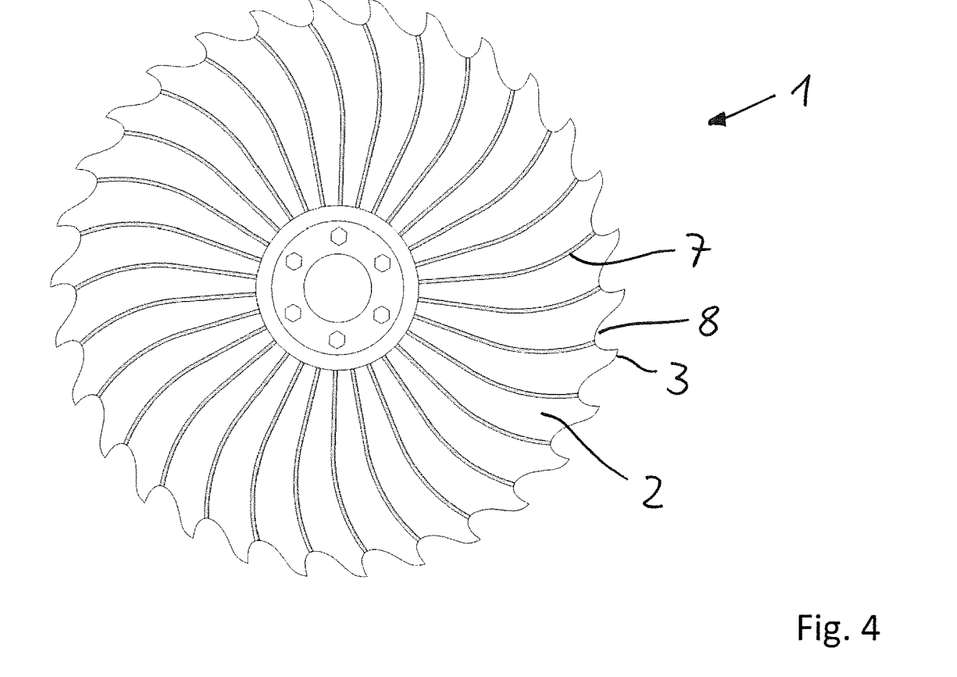
FIG. 4 a top view of another embodiment of a sawblade according to the invention.
Figure 5:
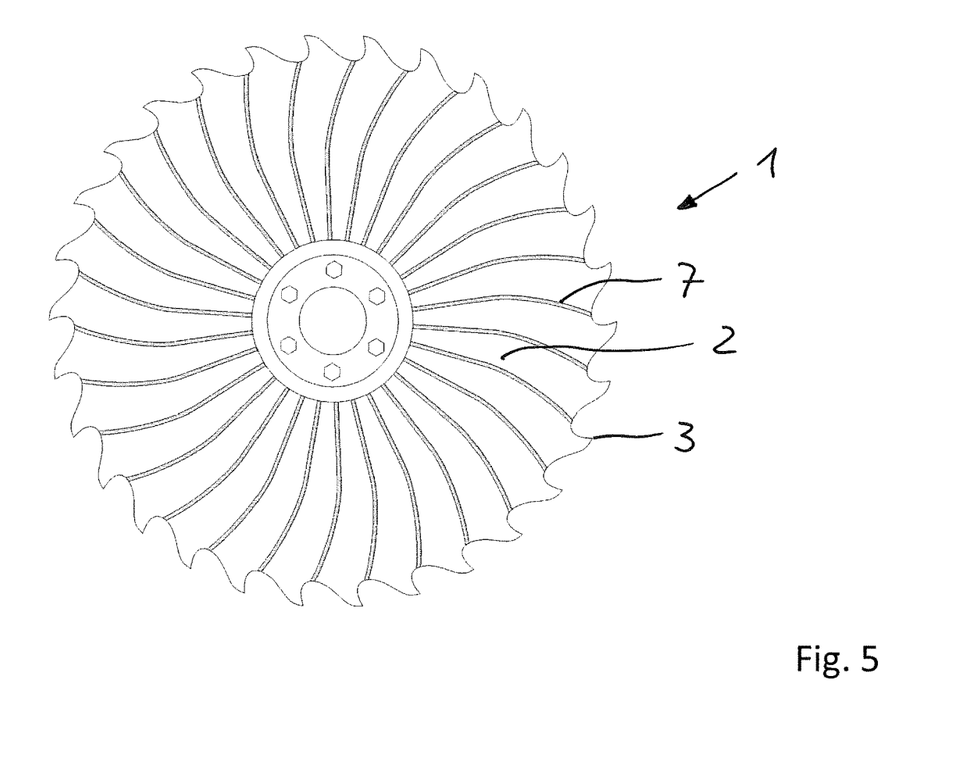
FIG. 5 a top view of another embodiment of a sawblade according to the invention.

FIGS. 4 and 5 also show top views of two exemplary embodiments for a sawblade 1 embodied according to the invention in which the progressions of the channels 7 are mirrored. Except for the channels 7 these sawblades 1 are embodied identically to the previous exemplary embodiments.

Figure 6:
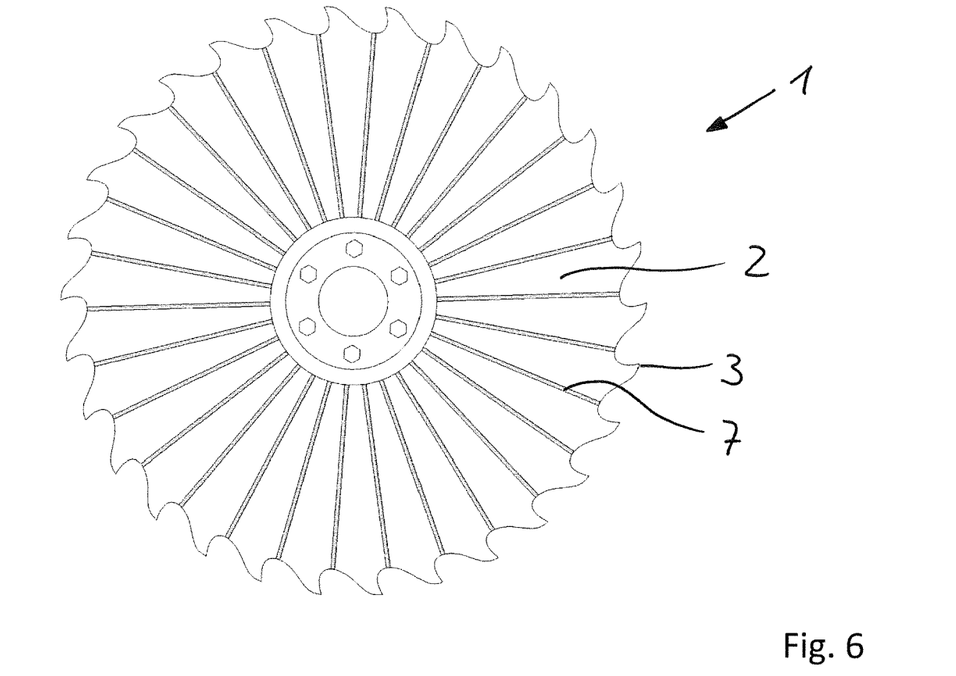
FIG. 6 a top view of another embodiment of a sawblade according to the invention.

FIG. 6 shows a top view of a sawblade 1, with its channels 7 extending radially in a straight line. Here too the remaining features are once more identical to the features of the previous exemplary embodiments.

Figure 7:
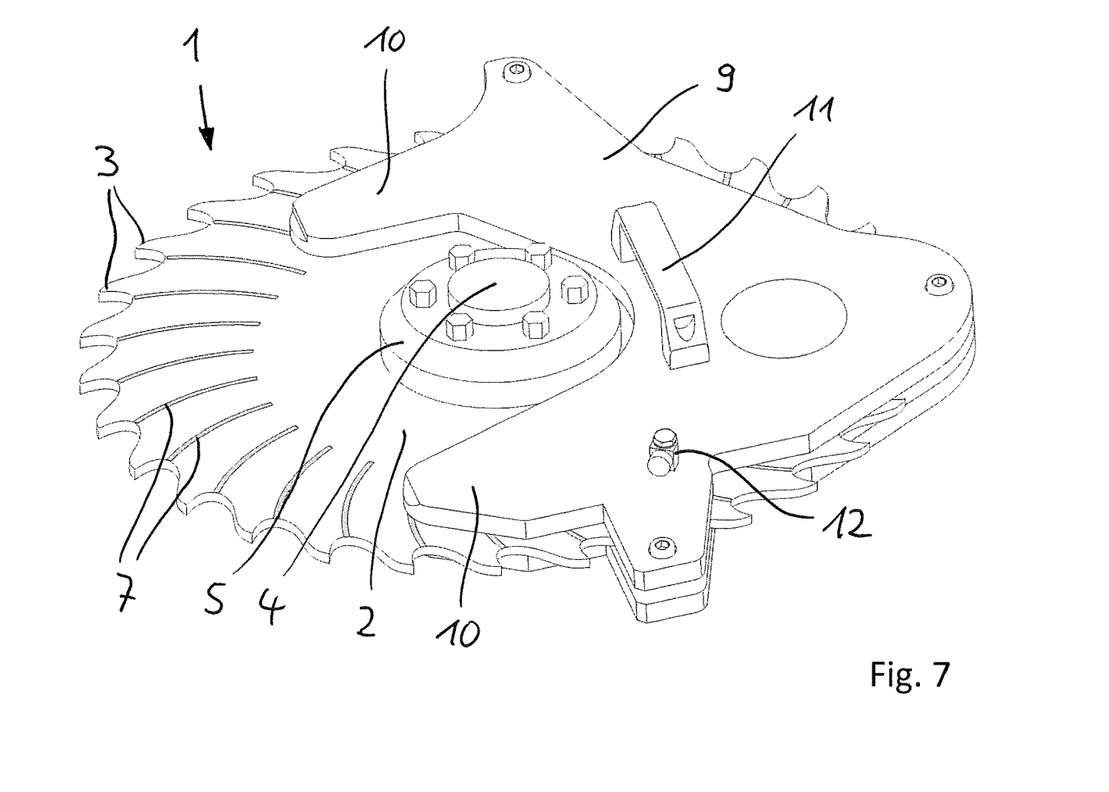
FIG. 7 a perspective view of a sawblade with a guiding device.

FIG. 7 is a perspective view of a sawblade 1, which in turn comprises a core blade 2 with saw teeth 3 formed thereon in one piece, rests on a driveshaft 4, and is fastened thereat via a flange 5. Additionally, it shows a guiding device 9, which comprises particularly two fasteners 10 in which (not visible here) gliding parts made from hard metal are resting, by which the core blade 2 is guided. The guiding device 9 comprises a handle 11 by which it can be unfolded in order to allow exchanging the sawblade 1 as well as perhaps also the gliding parts in the fasteners 10.

The particular feature of this exemplary embodiment comprises that the channels 7 in the side area of the core blade 2 do not extend to the flange 5 but only from an area, which is brushed by the gliding parts of the guiding device 9, to respectively the chip spaces 8 between the saw teeth 3. Since the liquid that shall be guided through the channels 7 is generally a cooling-lubricating emulsion, here it is introduced via a liquid connector 12 of the guiding device 9 into it and forwarded by the channels 7.

This exemplary embodiment is advantageous in that the channels 7 need to be embodied only with a relatively short design (however it is not excluded in this exemplary embodiment to allow the channels reaching up to an area underneath the flange 5) and the path of the liquid inside the channels 7 is relatively short. The supply of the liquid via the liquid connection 12 of the guiding device 9 is uncomplicated. On the other side the fasteners 10 of the guiding device 9 are arranged as closely as possible near the external perimeter of the core blade 2, due to the principle applied here, so that the cutting area of the sawblade 1 is located at an angular range which is between the two fasteners 10 and their gliding parts. This results in the need for the channels 7 to be formed such that the liquid essentially exits only between the saw teeth 3 when they enter into the material to be sawed.

Figure 8:
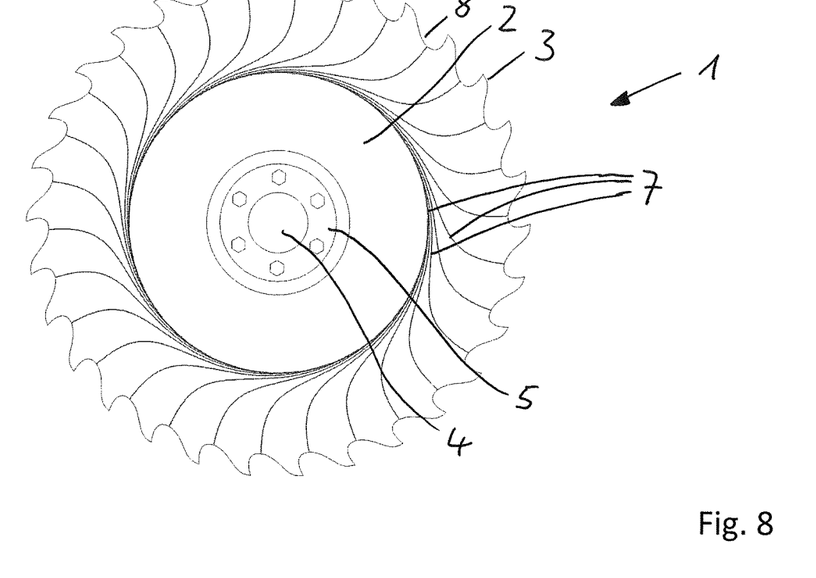
FIG. 8 a top view of another embodiment of a sawblade according to the invention.
Figure 9:
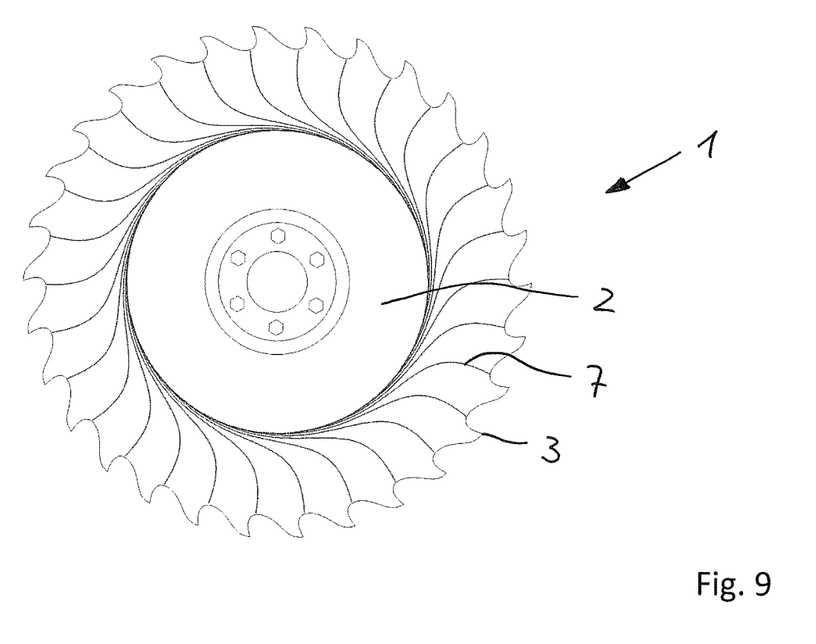
FIG. 9 a top view of another embodiment of a sawblade according to the invention.
Figure 10:
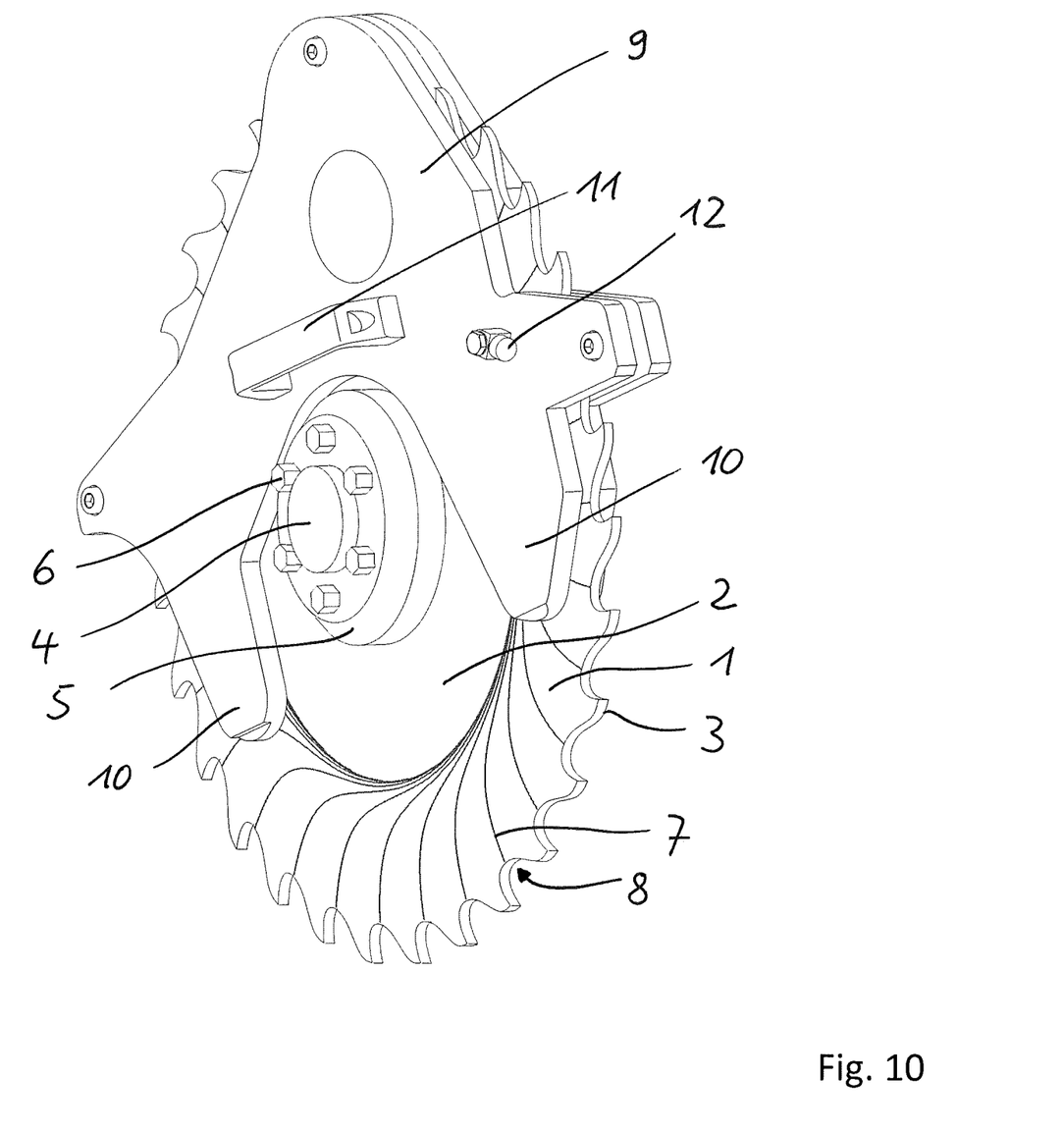
FIG. 10 a perspective view of the sawblade of FIG. 9, comprising a guiding device.

FIGS. 8 and 9 show a top view of two exemplary embodiments of a sawblade 1 according to the invention, with their channels once more being mirrored and not extending to the central areas of the core blade 2. The channels 7 of these exemplary embodiments are rather provided to cooperate with a guiding device 9, as shown in FIG. 10. The arc-shaped progression of the channels 9 is here optimized such that the liquid 7, which is supplied in the guiding device 9 (via the liquid connection 12) initially accelerates in the direction of rotation and then with increasing speed and accordingly rising centrifugal force reaches a more radially extending section of the channels 7, where it then is essentially only accelerated in the radial direction in order to reach the chip spaces 8 of the sawblade 1 at a speed as high as possible.

The invention claimed is:

1. A sawblade for a circular saw, comprising a disk-shaped core blade (2) made from one or more parts, with a plurality of circumferentially distributed saw teeth (3) arranged at an external perimeter thereof, a center comprising a connection (5, 6) for fastening the sawblade (1) at a driveshaft (4), and at least one side area of the core blade (2) is provided with open channels (7) for guiding liquids, and a surface of the side area of the core blade (2) provided with the channels (7) is equipped with a liquid-repellent coating,
    the channels (7) being located on an outwardly facing, visible surface of the sawblade configured to engage a workpiece,
    the liquid-repellent coating is provided on the surface of the at least one side area outside of the channels (7), and the channels (7) are not provided with the liquid-repellent coating,
    wherein the connection for fastening the sawblade (1) to a driveshaft (4) comprises at least one flange (5)

attached to the core blade (2), and at least a portion of the channels (7) extend completely to a periphery of the flange (5).

2. The sawblade according to claim 1, wherein the channels (7) are inserted by way of engraving in the side area of the core blade (2).

3. The sawblade according to claim 1, wherein the channels (7) extend from at least one of a central area or an area of the core blade (2) brushed by a guiding device (9) essentially to the external perimeter of the core blade (2).

4. The sawblade according to claim 3, wherein the channels (7) end at the external perimeter of the core blade (2) respectively between the saw teeth (3).

5. The sawblade according to claim 1, wherein the channels (7) have an arc-shaped progression in order to accelerate a liquid guided therein, due to rotation of the sawblade (1) and a thus generated centrifugal force, towards the external perimeter of the core blade (2).

6. The sawblade according to claim 1, wherein the flange (5) forms a liquid reservoir between itself and the side area of the core blade (2), and at least the portion of the channels (7) that extends underneath the flange reaches into the liquid reservoir.

7. The sawblade according to claim 6, wherein the flange (5) is provided with a liquid supply that is connected to the liquid reservoir.

8. The sawblade according to claim 1, wherein the sawblade (1) is provided with a guiding device (9), which comprises at least one fastener (10) and gliding parts for an at least temporarily gliding contact to the core blade (2), and at least a portion of the channels (7) partially extends in an area brushed by the guiding device (9), and the fastener (10) of the guiding device (9) includes a liquid connection (12).

9. A method for producing a sawblade (1) according to claim 1, comprising engraving the open channels (7) for guiding liquids.

10. The circular sawing machine according to claim 1, wherein the flange (5) forms a liquid reservoir between itself and the side area of the core blade (2), and at least the portion of the channels (7) that extends sectionally underneath the flange reaches into the liquid reservoir, and the driveshaft (4) includes a liquid passage which extends from a connection to a liquid reservoir formed between the flange (5) and the side area of the core blade (2).

11. The circular sawing machine according to claim 1, further comprising a guiding device (9) for the sawblade (1), which comprises at least one fastener (10) and gliding parts for at least a temporarily gliding contact with the core blade (2), the guiding device (9) being provided with a liquid connection (12), and with at least a portion of the channels (7) extending on at least one side area of the core blade (2) of the sawblade (1) in an area brushed by the guiding device (9).

12. The sawblade according to claim 1, wherein the channels (7) have an arc-shaped progression.

* * * * *